United States Patent
Kusano et al.

(10) Patent No.: US 6,465,575 B1
(45) Date of Patent: Oct. 15, 2002

(54) PRODUCT HAVING REDUCED FRICTION AND IMPROVED ABRASION RESISTANCE

(75) Inventors: Hiroo Kusano; Yasuaki Yamamoto; Hideki Yagyu, all of Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/421,850

(22) Filed: Oct. 20, 1999

(30) Foreign Application Priority Data

Oct. 22, 1998 (JP) .......................................... 10-300768

(51) Int. Cl.[7] .............................. C08J 3/28; C08L 27/12; C08L 27/18; C08L 27/20
(52) U.S. Cl. ...................... 525/199; 525/200; 522/156; 522/155
(58) Field of Search .............................. 522/156, 112, 522/155; 525/199, 200

(56) References Cited

U.S. PATENT DOCUMENTS

| | | | |
|---|---|---|---|
| RE28,628 E | * 11/1975 | Carlson et al. | ............ 264/470 |
| 4,859,836 A | * 8/1989 | Lunk et al. | ................. 219/505 |
| 5,426,128 A | 6/1995 | Bürger et al. | |
| 5,444,103 A | * 8/1995 | Tabata et al. | ................ 522/156 |
| 5,985,949 A | * 11/1999 | Seguchi et al. | ............. 522/156 |

FOREIGN PATENT DOCUMENTS

| | | |
|---|---|---|
| EP | 0 616 004 A1 | 9/1994 |
| EP | 0 801 095 A1 | 10/1997 |

* cited by examiner

Primary Examiner—Susan W. Berman
(74) Attorney, Agent, or Firm—Scully, Scott, Murphy & Presser

(57) ABSTRACT

A fluoroplastic-based product having reduced friction and improved abrasion resistance having excellent abrasion resistance as well as good characteristics being inherent to fluoroplastics comprises a fluoroplastic molded material containing a modified fluoroplastic prepared by applying ionizing radiation to a fluoroplastic (I) heated at the melting point or a higher temperature under an inert gas atmosphere having 10 torr or less oxygen concentration within a range of irradiation doses of from 1 KGy to 10 MGy; and an unmodified fluoroplastic (II).

4 Claims, No Drawings

PRODUCT HAVING REDUCED FRICTION AND IMPROVED ABRASION RESISTANCE

FIELD OF THE INVENTION

The present invention relates to a product having reduced friction and improved abrasion resistance made from fluoroplastics used for a nonlubricated bearing, a dynamic seal and the like, and particularly to a product having reduced friction and improved abrasion resistance having excellent abrasion resistance.

Fluoroplastics are excellent in electric characteristics as well as in resistance to chemicals and heat, so that they have been extensively utilized for a variety of applications for both an industrial and a consumer use. However, such fluoroplastics may not be used in a sliding environment due to remarkable abrasion. In this respect, it has been tried to add a certain filler to fluoroplastics for the sake of improving abrasion resistance or deformation of a molded material of fluoroplastics.

Such filler, however, impairs excellent characteristics inherent to the fluoroplastics. As a result, it has had limited uses according to circumstances and has not always been satisfactory.

SUMMARY OF THE INVENTION

Accordingly, an object of the present invention is to provide a fluoroplastic product having reduced friction and improved abrasion resistance having excellent abrasion resistance and which maintains its excellent characteristics inherent thereto.

According to the feature of the present invention, a product having reduced friction and improved abrasion resistance comprises:

a fluoroplastic molded material containing a modified fluoroplastic prepared by applying ionizing radiation to a fluoroplastic (I) heated at the melting temperature or a higher temperature under an inert gas atmosphere having 10 torr or less oxygen concentration within a range of irradiation doses of from 1 KGy to 10 MGy; and an unmodified fluoroplastic (II).

According to an embodiment of the invention, it is preferred that a ratio of incorporation of the modified fluoroplastic and the unmodified fluoroplastic ranges from 10 to 90% by weight of the former with respect to from 90 to 10% by weight of the latter. In this respect, there is such a tendency that the larger amount of the latter results in the lower coefficient of abrasion, so that its abrasion wear increases.

DESCRIPTION OF THE PREFERRED EMBODIMENTS

An example of the fluoroplastics (I) and (II) used for the present invention includes tetrafluoloethylene-based polymers (hereinafter referred to as "PTFE"), tetrafluoroethylene-perfluoro(alkyl vinyl ether)-based copolymers (hereinafter referred to as "PFA"), and tetrafluoroethylene-hexafluoropropylene-based copolymers (hereinafter referred to as "FEP").

The above described PTFE includes also those containing 1 mol % or less of a polymeric unit derived from a copolymerizable monomer such as perfluoro(alkyl vinyl ether), hexafluoropropylene, (perfluoroalkyl)ethylene, and chlorotrifluoroethylene. Furthermore, the fluoroplastics in the above described copolymeric form may contain a small amount of a third component in their molecular structures.

In the present invention, it is preferred that the heat of crystallization in a fluoroplastic before irradiation is 50 J/g or less. When the quality exceeds such value as described above, the abrasion resistance of the fluoroplastic decreases. The heat of crystallization in the present invention is determined as follows: For measuring the heat of crystallization, the temperature rise and temperature descent of the fluoroplastic are repeated two times, respectively, per 10° C./min. within a range of from 50 to 360° C. The heat of crystallization of the fluoroplastic is calculated from the peak area, which is an area under a corresponding peak. Herein, the peak area is defined by a base line of a DSC (Differential Scanning Calorimeter) curve and one peak of the DSC curve in case of the second temperature descent.

Applications for a product having reduced friction and improved abrasion resistance according to the present invention include, for example, a nonlubricated bearing, a dynamic seal, rolls for copying machine, and a bearing pad. In this respect, it is expected to use a product having reduced friction and improved abrasion resistance according to the present invention in a field wherein fluoroplastics have heretofore been applied hardly.

As a specific manner for preparing a product having reduced friction and improved abrasion resistance of the present invention includes a method for pressure molding a mixture of a modified powder of fluoroplastics which has been exposed to ionizing radiation and a powder (or pellets) of fluoroplastics which has not yet been exposed to ionizing radiation, and a method for admixing a fluoroplastic with another heat-resisting plastic material, and then molding the resulting admixture into a form of product having reduced friction and improved abrasion resistance.

In the present invention, an example of ionizing radiation to be used includes γ rays, electron rays, X rays, neutron radiation and high-energy ions. It is preferred to expose fluoroplastics to ionizing radiation in the absence of oxygen. Furthermore, it is preferred that an irradiation dose of ionizing radiation is within a range of from 1 KGy to 10 MGy. A more preferable irradiation dose is within a range of from 10 KGy to 1500 KGy in view of improvements in characteristics of low friction, abrasion resistance, and resistance to load of fluoroplastics.

In case of applying ionizing radiation, it is necessary for heating a fluoroplastic used at its crystalline melting point or a higher temperature. More specifically, when a PTFE is used as a fluoroplastic material, it is preferred to expose to ionizing radiation the fluoroplastic material which is under a heating condition at a higher temperature than 327° C. being the crystalline melting point of the PTFE used. In case of employing a PFA or an FEP, it is required to expose such a material to ionizing radiation under a heating condition wherein the former PFA is heated at its crystalline melting point of 310° C. or a higher temperature, while the latter FEP is heated at its melting point of 275° C. or a higher temperature.

To heat a fluoroplastic at its crystalline melting point or a higher temperature means to activate molecular motion of backbone chains which constitute the fluoroplastic, whereby it becomes possible to efficiently accelerate crosslinking reactions among molecules. However, excessive heating brings about adversely cutting and decomposition of the molecular backbone chains. Therefore, a heating temperature should be limited to a range wherein it is 10 to 30° C. higher than a crystalline melting point of fluoroplastics in view of suppressing an occurrence of such a depolymerizing phenomenon.

EXAMPLE

Examples 1 and 2

A modified fluoroplastic was obtained by exposing a PTFE molding powder (Trade Name: G-163 manufactured by Asahi Glass Co., Ltd.; 40 μm average particle diameter, and 2.16 specific gravity) to electron radiation (2 MeV acceleration voltage) of an irradiation dose of 100 KGy at a heating temperature of 350° C. under an atmosphere of 1 torr oxygen concentration and 800 torr nitrogen concentration. The resulting modified fluoroplastic powder was ground in a jet mill until an average particle diameter thereof reached about 20 μm, and then it was incorporated with 20% by weight (Example 1) and 30% by weight (Example 2) of a fluoroplastic powder (PTFE molding powder (Trade Name: G-163 manufactured by Asahi Glass Co., Ltd.; 40 μm average particle diameter, and 2.16 specific gravity)) which had not yet been exposed to ionizing radiation, respectively, to obtain two types of admixtures. Each of these admixtures was blended with a mixer, and then it was subjected to heat treatment at 300° C. for 12 hours to remove high-temperature volatile components. A metal mold was charged with each of the resulting mixed powder, and pressurized at 500 kg/cm$^2$ to execute preforming. The preformed material was calcined at a temperature of from 350° C. to 400° C. to prepare a block having a dimension of 50 mm (length)×50 mm (width)×10 mm (thickness).

Examples 3 and 4

The same modified fluoroplastic powder (ground in a jet mill) was incorporated with 20% by weight (Example 3) and 30% by weight (Example 4) of PFA pellets (Teflon 340J manufactured by du Pont Company; 2.14 specific gravity, and 27 J/g heat quantity of crystallization), respectively, to obtain two types of admixtures. Each of these admixtures was blended with a mixer at 300° C. Then a metal mold was charged with each of the resulting products, and thermally press-molded at 350° C. under 100 kg/cm$^2$ pressure to prepare a block having a dimension of 50 mm (length)×50 mm (width)×10 mm (thickness).

Example 5

The same modified fluoroplastic powder (ground in a jet mill) as that of Example 1 was incorporated with 10% by weight of FEP pellets (NP-100 manufactured by Daikin Co., Ltd.; 2.14 specific gravity, and 15 J/g heat quantity of crystallization), and the resulting admixture was blended with a mixer at 320° C. Then a metal mold was charged with the product thus blended, and thermally press-molded at 320° C. under 100 kg/cm$^2$ pressure to prepare a block having a dimension of 50 mm (length)×50 mm (width)×10 mm (thickness).

Example 6

A mixture containing 30% by weight of the same modified fluoroplastic powder (ground in a jet mill) as that of Example 1, 10% by weight of graphite (US10 manufactured by Rosane Company), and 60% by weight of the same fluoroplastic powder as that of Example 1 which had not yet been exposed to ionizing radiation was blended with a mixer. Thereafter, the resulting admixture was heat-treated treated at 300° C. for 12 hours to remove high-temperature volatile components. A metal mold was charged with the mixed powder thus obtained, and pressurized under 500 kg/cm$^2$ pressure to execute preforming. The preformed material was calcined in an electric furnace at a temperature of from 350° C. to 400° C. to prepare a block having a dimension of 50 mm (length)×50 mm (width)×10 mm (thickness).

Example 7

PTFE molding powder (Trade Name: G-163 manufactured by Asahi Glass Co., Ltd.; 40 μm average particle diameter, 2.16 specific gravity) was exposed to electron radiation (2 MeV acceleration voltage) of an irradiation dose of 500 KGy at a heating temperature of 350° C. under an atmosphere of 1 torr oxygen concentration and 800 torr nitrogen concentration to obtain a modified fluoroplastic. The resulting modified fluoroplastic powder was ground in a jet mill until an average particle diameter thereof reached about 20 μm, and then it was incorporated with 50% by weight of a fluoroplastic powder (PTFE molding powder (Trade Name: G-163 manufactured by Asahi Glass Co., Ltd.; 40 μm average particle diameter, and 2.16 specific gravity)) which had not yet been exposed to ionizing radiation to obtain an admixture. The admixture thus obtained was blended with a mixer, and then it was subjected to heat treatment at 300° C. for 12 hours to remove high-temperature volatile components. A metal mold was charged with the resulting mixed powder, and pressurized at 500 kg/cm$^2$ to execute preforming. The preformed material was calcined at a temperature of from 350° C. to 400° C. to prepare a block having a dimension of 50 mm (length)×50 mm (width)×10 mm (thickness).

Example 8

PFA pellet (Teflon 340J manufactured by du Pont Company; 2.14 specific gravity; and 27J/g heat quantity of crystallization) was exposed to electron radiation (2 MeV acceleration voltage) of an irradiation dose of 100 KGy at a heating temperature of 318° C. under an atmosphere of 0.1 torr oxygen concentration and 800 torr nitrogen concentration to obtain a modified fluoroplastic. The resulting modified fluoroplastic powder was ground until an average particle diameter thereof reached about 40 μm, and then it was incorporated with 20% by weight of a fluoroplastic powder (PTFE molding powder (Trade Name: G-163 manufactured by Asahi Glass Co., Ltd.; 40 μm average particle diameter, and 2.16 specific gravity)) which had not yet been exposed to ionizing radiation to obtain an admixture. The admixture thus obtained was blended with a mixer, then a metal mold was charged therewith, and pressurized at 500 kg/cm$^2$ to execute preforming. The preformed material was calcined at a temperature of from 340° C. to 360° C. to prepare a block having a dimension of 50 mm (length)×50 mm (width)×10 mm (thickness).

Example 9

A mixture containing 20% by weight of the same modified fluoroplastic powder (ground in a jet mill) as that of Example 1, 20% by weight of the same modified PFA powder (ground) as that of Example 8, and 60% by weight of the same fluoroplastic powder, which had not yet been exposed to ionizing radiation, as that of Example 1 was blended with a mixer, and then melt-blended by the use of a melt extruder to obtain pellets. The pellets were injection-molded under the condition of 320° C. resin temperature, 2000 kgf/cm$^2$ injection pressure, and 140° C. metal mold temperature to prepare a block having a dimension of 50 mm (length)×50 mm (width)×10 mm (thickness).

Comparative Example 1

A metal mold was charged with a PTFE molding powder (Trade Name: G-163 manufactured by Asahi Glass Co., Ltd.; 40 μm average particle diameter, and 2.16 specific gravity), and pressurized under 500 kg/cm$^2$ pressure to execute preforming. The preformed product was calcined in an electric furnace at a temperature of from 350° C. to 400° C. to prepare a block having a dimension of 50 mm (length)×50 mm (width)×10 mm (thickness).

Comparative Example 2

PTFE molding powder (Trade Name: G-163 manufactured by Asahi Glass Co., Ltd.; 40 μm average particle diameter, and 2.16 specific gravity) was exposed to electron radiation (2 MeV acceleration voltage) of an irradiation dose of 0.1 KGy at a heating temperature of 350° C. under the atmosphere of 1 torr oxygen concentration and 800 torr nitrogen concentration. The resulting fluoroplastic powder was ground in a jet mill until an average particle diameter thereof reached about 20 μm, and then it was incorporated with 20% by weight of a fluoroplastic powder (PTFE molding powder (Trade Name: G-163 manufactured by Asahi Glass Co., Ltd.; 40 μm average particle diameter, and 2.16 specific gravity)) which had not yet been exposed to ionizing radiation to obtain an admixture. The admixture thus obtained was blended with a mixer, and then it was subjected to heat treatment at 300° C. for 12 hours to remove high-temperature volatile components. A metal mold was charged with the resulting mixed powder, and pressurized at 500 kg/cm² to execute preforming. The preformed material was calcined at a temperature of from 350° C. to 400° C. to prepare a block having a dimension of 50 mm (length)×50 mm (width)×10 mm (thickness).

Comparative Example 3

The same modified fluoroplastic powder (ground in a jet mill) as that of Example 1 was incorporated with 95% by weight of the same fluoroplastic powder, which had not yet been exposed to ionizing radiation, as that of Example 1, the resulting mixture was blended with a mixer, and then heat-treated at 300° C. for 12 hours to remove high-temperature volatile components. A metal mold was charged with the resulting mixed powder, and pressurized at 500 kg/cm² to execute preforming. The preformed material was calcined in an electric furnace at a temperature of from 350° C. to 400° C. to prepare a block having a dimension of 50 mm (length)×50 mm (width)×10 mm (thickness).

Test results obtained by measuring each coefficient of friction and each coefficient of abrasion of the block product having reduced friction and improved abrasion resistances in Examples and Comparative Examples are shown in Table 1. A thrust type friction and abrasion testing machine was used for the tests wherein 2.5 kg/cm² pressure was applied to each test specimen in the Examples 1 to 10 as well as the Comparative Examples 1 and 2 by the use of a cylindrical ring made of SUS304 (25.6 mm outer diameter φ, 20.6 mm inner diameter φ, and 0.2μ average roughness) at 0.5 m/sec. speed. In this case, a PV value of a multiplied value of the pressure by the speed was 1.25 kg·m/cm²·sec. After measuring decrease in weight of a test specimen after 50 hours lapse of testing time, the decreased weight of the test specimen was converted into decreased volume, which was divided by a contact area of the cylindrical ring to calculate abrasion depth.

The resulting coefficients of abrasion K (m·sec/MPa/m/hr×10⁻⁶) were determined from the relational expression W=KPVT where W is abrasion depth (m), P is load (MPa), V is velocity (m/sec.), and T is time (hr), respectively.

TABLE 1

|  | Coefficient of Friction | Coefficient of Abrasion |
| --- | --- | --- |
| Example 1 | 0.31 | 0.42 |
| Example 2 | 0.33 | 0.28 |
| Example 3 | 0.36 | 0.42 |
| Example 4 | 0.36 | 0.28 |
| Example 5 | 0.36 | 0.25 |
| Example 6 | 0.38 | 0.35 |
| Example 7 | 0.38 | 0.14 |
| Example 8 | 0.38 | 0.85 |
| Example 9 | 0.32 | 0.43 |
| Comparative Example 1 | 0.25 | Abnormal Abrasion |
| Comparative Example 2 | 0.25 | Abnormal Abrasion |
| Comparative Example 3 | 0.28 | 68 |

According to the present invention as described above, as is apparent from the foregoing results by comparing the Examples with the Comparative Examples, all the product having reduced friction and improved abrasion resistances in the Comparative Examples indicate either abnormal abrasion or significant abrasion depth, while it is observed that all the product having reduced friction and improved abrasion resistances in accordance the present invention exhibit excellent abrasion resistance with low coefficient of abrasion which proves good lubrication characteristics of the resulting product having reduced friction and improved abrasion resistances.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A product having reduced friction and improved abrasion resistance comprising:
    a fluoroplastic molded material containing a modified fluoroplastic prepared by applying ionizing radiation to a fluoroplastic (I) heated at the melting point or a higher temperature under an inert gas atmosphere having a 10 torr or less oxygen concentration within a range of irradiation doses of from 1 KGy to 10 MGy; and an unmodified fluoroplastic (II), said fluoroplastic (II) is selected from the group consisting of tetrafluoroethylene-perfluoro-(alkyl vinyl ether)-based copolymers and tetrafluoroethylene-hexafluoropropylene copolymers, and said fluoroplastic (I) is selected form the group consisting of tetrafluoroethylene-based polymers, tetrafluoroethylene-perfluoro-(alkyl vinyl ether)-based copolymers, and tetrafluoroethylene-hexafluoropropylene copolymers.

2. The product having reduced friction and improved abrasion resistance according to claim 1, wherein the fluoroplastic molded material contains 10 to 90% by weight of a modified fluoroplastic and 90 to 10% by weight of an unmodified fluoroplastic (II).

3. The product having reduced friction and improved abrasion resistance as claimed in claim 1, wherein the fluoroplastic (I) is a tetrafluoroethylene-based polymer, the fluoroplastic (II) is a tetrafluoroethylene-perfluoro(alkyl vinyl ether)-based copolymer, and the fluoroplastic molded material contains 10 to 90% by weight of a modified fluoroplastic and 90 to 10% by weight of the unmodified fluoroplastic (II).

4. The product having reduced friction and improved abrasion resistance according to claim 1, wherein a heat of crystallization of a fluoroplastic (I) prior to the application of ionizing radiation is 50 J/g or less.

* * * * *